Patented June 5, 1951

2,555,876

UNITED STATES PATENT OFFICE 2,555,876

POLYVINYL ACETAL STABILIZED WITH MELAMINE-FORMALDEHYDE

Robert N. Crozier, Edward Lavin, and Alfred T. Marinaro, Springfield, Mass., assignors to Shawinigan Resins Corporation, Springfield, Mass., a corporation of Massachusetts No Drawing. Application January 8, 1947,
Serial No. 720,918

2 Claims. (Cl. 260—45.8)

This invention relates to the stabilization of polyvinyl acetal resin compositions. More particularly, this invention relates to the stabilization of polyvinyl acetal resins formed in the presence of sulfuric acids.

Stabilization of polyvinyl acetal resin made with sulfuric acid catalysts has presented a serious problem. Thus, even after repeated washings of such resins, the products are found to discolor rapidly at elevated temperatures. Even the use of alkali metal hydroxides or basic reacting salts thereof to stabilize such products has not been completely satisfactory. For example, interleaf compositions made from polyvinyl acetal resins treated with such alkaline materials tend to have substantially reduced adhesion to glass, particularly when there is a substantial excess of alkali. Also, outside exposure of laminated glass bonded with interleaf compositions comprising such resins, tends to result in separation of the plastic from the glass, particularly around the edges.

It is an object of this invention to provide stable polyvinyl acetal resins. It is a particular object of this invention to overcome disadvantages in polyvinyl acetal resins treated with alkali metal hydroxides or salts thereof made with weak acids.

These and other objects are attained according to the present invention by incorporating a soluble reaction product of melamine and formaldehyde with a polyvinyl acetal resin made in the presence of a sulfuric acid and thereafter treated with a basic reacting alkali metal compound.

The following examples are illustrative of the present invention, but are not to be construed as limitative of the scope thereof. Where parts are mentioned, they are parts by weight.

The polyvinyl acetal resin used in the examples may be prepared in the following manner. Vinyl acetate is suitably polymerized to such a degree that a one molar benzene solution possesses a viscosity of substantially 50 centipoises at 20° C. The resulting polyvinyl acetate is then hydrolyzed and the hydrolysis product reacted with butyraldehyde in ethanol solution in the presence of a suitable quantity of sulfuric acid. The degree of hydrolysis, amount of butyraldehyde, duration of the reaction and other reaction conditions are so correlated as to produce a polyvinyl butyraldehyde acetal resin which is found to contain, on a weight basis, 16–22% hydroxyl groups calculated as polyvinyl alcohol, less than 3% acetate groups calculated as polyvinyl acetate and the balance substantially butyraldehyde acetal. The product comprises a solution of the above acetal resin in ethanol from which the acetal resin is precipitated by the addition of water and repeatedly washed with water until substantially all of the acid is removed. The product is then suspended in a solution of ethanol in water containing about 37% ethanol. Substantially 1000 parts of the suspension medium are used for every 100 parts of the acetal resin. The suspension is then maintained at about 45° C. for several hours under suitable conditions of agitation while being maintained slightly alkaline to phenolphthalein indicator by the addition of suitable quantities of potassium hydroxide. At the end of this period, which usually requires about 3–5 hours, it is found that the suspension medium in contact with the resin no longer requires further additions of potassium hydroxide to maintain the suspension medium alkaline. The acetal resin is then separated from the suspension medium, washed thoroughly and dried.

Example I 100 parts of the KOH-treated polyvinyl butyraldehyde acetal resin described above are mixed with 43 parts of triethylene glycol dihexoate to form a plasticized resin composition. To this plasticized resin is added 0.5%, based on the resin content of the plastic, of the water-soluble reaction product of 3 mols of formaldehyde with 1 mol of melamine, and thoroughly mixed therewith. The resulting mixture is placed in a glass tube and after sealing off the tube, heated at 160° C. for 2 hours. The product, as a result of this treatment, is found to be in a fused condition, transparent, light yellow in color, and soluble in ethanol.

Example II

Example I is repeated except that the quantity of the melamine-formaldehyde reaction product is reduced from 0.5% to 0.1%. After subjecting to the same heat treatment, the product has characteristics similar to those of the heat treated product of Example I.

Example III

Example II is repeated except that the melamine-formaldehyde reaction product is obtained by reacting 4 mols of formaldehyde with 1 mol of melamine. The product behaves similarly on heat treatment.

Example IV

Example II is repeated except that the melamine reaction product is the product resulting from etherifying with ethanol the water-soluble reaction product of 4 mols of formaldehyde with 1 mol of melamine. The resulting product, on heat treatment, as in Example I, fuses to a clear, ethanol-soluble product which is very light in color.

In contrast to the results obtained according to this invention as illustrated by Examples I to IV, when an attempt is made to use melamine-formaldehyde reaction products as the sole stabilizing material, i. e., adding the melamine-formaldehyde reaction product to the polyvinyl butyraldehyde resin which has been washed with water, but not treated with potassium hydroxide, the resulting product is found to discolor badly on heat treatment when small amounts of the melamine-formaldehyde product are used and to lose its solubility in ethanol when sufficient amounts of the melamine-formaldehyde product are used to obtain a heat-stable product.

In further contrast to the results obtained in the Examples I–IV, if substantially larger quantities of melamine-formaldehyde products are used, e. g. 5%, the products are found to lose their solubility in ethanol after heat treatment and to remain in an unfused condition.

The polyvinyl acetal resins used in the process of the invention are, as pointed out above, made in the presence of a sulfuric acid. Various processing conditions may be used in carrying out the acetalization. The acetal resin used in the examples is made by reacting an aldehyde with hydrolyzed polyvinyl ester in the presence of a solvent for the product, and precipitating the resin product with water. Other methods may be used, as for example, carrying out the reaction in the presence of a non-solvent dispersing medium such as water or a non-solvent mixture of water and solvent, e. g., a water-ethanol mixture.

Prior to incorporation of the melamine-formaldehyde reaction product, the polyvinyl acetal resins are given a preliminary treatment with alkaline materials such as potassium hydroxide. Such a process is described, for example, in U. S. 2,258,410 and U. S. 2,282,057. In giving the acetal resins this preliminary treatment, sufficient alkaline material is associated with the resin so that solutions thereof show an alkaline reaction in the presence of brom-phenol blue. Usually, the resin is sufficiently alkaline so that a solution thereof (for example, a 3% methanol solution) requires 5–50 cubic centimeters of N/100 hydrochloric acid solution for every 100 grams of resin. Such resins are referred to as having an "alkaline titer" of 5–50.

A particular advantage of the process of the invention resides in the fact that resins of low "alkaline titer" may be rendered heat-stable. Thus, previously it has been considered necessary for the acetal resin to have an "alkaline titer" of more than 25, e. g. 30–50, unless there is rigorous control of the reaction to reduce the non-extractable sulfur content to an unusually low value, i. e., not over 0.025% calculated as $SO_4$ and even with such high "alkaline titers" heat stability is not always attained. Thus, the acetal resin used in the examples has an "alkaline titer" of 34 and yet on heating for 2 hours at 160° C. in a closed tube, it fuses to an ethanol-insoluble product which is reddish brown in color. However, by the addition of the melamine-formaldehyde reaction products in accordance with the present invention, much less rigorous control of the reaction is necessary and heat-stable products can be readily prepared from acetal resins having "alkaline titers" less than 25, e. g. 5–20.

Thus, the invention provides a method for overcoming the lack of heat stability of polyvinyl acetals which are still unstable after the association therewith of basic alkali metal compounds and, in particular, the invention makes possible the stabilization of polyvinyl acetal resins having a low excess of basic alkali metal compounds, i. e. an "alkaline titer" of 5–20, which resins have a non-extractable sulfur content of more than 0.025%, e. g., up to 0.1–0.2% calculated as $SO_4$.

The products of the invention, particularly those in which the resin used has a low "alkaline titer" are characterized by unusual adhesion to glass coupled with a high degree of resistance to discoloration on heating.

Further advantages of the products of the invention include resistance of laminated glass containing these compositions as bonding agents to separation of the glass from the interlayer on aging, particularly on outside exposure.

Numerous variations may be introduced into the invention as illustrated by the examples. For example, when desired, the melamine-formaldehyde reaction product may be associated with unplasticized resin, but since it is customary to use such resins in a plasticized condition, it is usually more convenient to incorporate the plasticizer prior to the stabilizer.

While the amount of the melamine-formaldehyde reaction product may be varied somewhat, depending upon the nature of the acetal resin being stabilized, and the use to which it is to be put, in order to avoid adversely affecting the ethanol solubility, it is preferred that the amount of the melamine-formaldehyde product does not equal an amount which causes the acetal resin to insolubilize. However, it is usually found that at least 0.05% should be incorporated in order to effect the improvements resulting from the invention.

The composition of the melamine-formaldehyde reaction product may be substantially varied. For example, the melamine product may comprise the product resulting from reacting 1–6 mols of formaldehyde and 1 mol of melamine. The extent of the reaction may also be substantially varied, i. e., the reaction may be stopped at the water-soluble stage or may be continued to the water-insoluble, but ethanol-soluble stage. However, it should not be carried to ethanol insolubility. As illustrated by the examples, melamine-formaldehyde reaction products per se may be be used, or alcohol-soluble etherified products thereof.

Thus, included within the scope of this invention are alcohol-soluble ethers of melamine-formaldehyde reaction products in which the residues of the alcohols or other substances employed in preparing the ethers vary widely in their chemical structures. These residues may comprise aliphatic, aromatic, aliphatic-aromatic, aromatic-aliphatic, hydro-aromatic and heterocyclic radicals. As examples of such radicals may be mentioned ethyl, propyl, butyl, amyl, phenyl, benzyl, toluyl, lauryl, cetyl, allyl, stearyl, oleyl, furfuryl, cyclohexyl and the like. When the ethers are made from alcohols, monohydric or polyhydric alcohols or mixtures thereof may be employed, although monohydric alcohols are preferred. Examples of such alcohols are methyl alcohol, ethyl alcohol, propyl alcohol, butyl alcohol, ethyl butanol, ethyl hexanol, lauryl alcohol, stearyl alcohol, benzyl alcohol, ethylene glycol, diethylene glycol, glycerol, sorbitol, terpineol, furfuryl alcohol and the like.

A preferred group of ethers comprises alkyl ethers of methylol melamine, particularly those in which the alkyl group is one containing less than 7 carbon atoms. When desired, the alkyl groups may be substituted, for example, with halogen atoms. Examples of such substituted groups are mono-, di-, and trichloroethyl, -propyl, -butyl, and -amyl radicals.

The process of the invention is applicable to the treatment of polyvinyl acetal resins made in the presence of catalysts other than $H_2SO_4$, as for example, organic hydrogen sulfates or mixtures of $H_2SO_4$ and organic hydrogen sulfates. The organic hydrogen sulfates which may be used include ethyl hydrogen sulfate and other organic hydrogen sulfates made from alkanols having up to about 18 carbon atoms, e. g. methanol, propanol, butanol, hexanol, octanol, octadecanol, etc. Other compounds containing alcoholic hydroxyl groups may also be used, e. g. glycols such as ethylene glycol, propylene glycol, diethylene glycol, tetraethylene glycol and the like, glycerine, erythritol, pentaerythritol, sorbitol, mannitol, aromatic alcohols such as benzyl alcohol, etc. The particular sulfuric acid selected depends in part on the nature of the polyvinyl acetal being prepared and other desired results. In preparing the acetal resins in the presence of a solvent, the use of alkanols having substantial compatibility with water are preferred, such as methanol, ethanol, propanols and butanols. The sulfuric acids may be added as such to the acetalization charge or may be present in the hydrolyzed polyvinyl acetate as a result of the use of a sulfuric acid as an hydrolysis catalyst.

Within the scope of this invention are polyvinyl acetal resins that have been treated with basic-reacting alkali metal compounds generally. In place of potassium hydroxide, other hydroxides of the alkali metals may be used such as the hydroxides of sodium, rubidium or cesium. In place of alkali metal hydroxides, basic-reacting salts of the alkali metals may be used, particularly salts of water-soluble acids. Examples of basic-reacting salts of alkali metals are alkali metal salts of carbonic acid, formic acid, acetic acid, propionic acid, butyric acid, benzoic acid, boric acid, citric acid, fumaric acid, lactic acid, maleic acid, malic acid, malonic acid, oxalic acid, phthalic acid, succinic acid, salicylic acid, tartaric acid, valeric acid and the like. When a steeping process is used, in which a weak organic acid is employed in the steeping liquid, it is generally preferred to use the corresponding alkali metal salt as the alkali stabilizer as pointed out in U. S. 2,258,410.

This invention is not limited as to the polyvinyl acetal resin employed or its method of preparation. Thus, in the preparation of the resin given hereinbefore, the vinyl acetate may be replaced by other suitable vinyl esters, such as vinyl propionate, vinyl butyrate and the like. In addition, the degree of polymerization of the vinyl acetate or other vinyl ester may be widely varied. In place of butyraldehyde, other carbonyl-containing compounds may be employed, as for example, formaldehyde, acetaldehyde, propionaldehyde, valeraldehyde, crotonaldehyde, acetone, cyclohexanone and the like and mixtures thereof. Furthermore, the polyvinyl acetal resin is not limited to any specific hydroxyl, ester or acetal group content.

It is to be understood that when the melamine-formaldehyde reaction product is added to plasticized resin, the nature and amount of the plasticizer may be widely varied. Thus, the acetal resin may be plasticized according to any of the teachings of the prior art. Examples of materials other than triethylene glycol dihexoate which have been suggested as plasticizers include dibutyl sebacate, the triethylene glycol esters of cocoanut oil acids, butyl laurate-dibutyl phthalate mixtures, etc.

It is to be understood that the above description is given by way of illustration only, and not of limitation, and that deviations are possible within the spirit of the invention.

What is claimed is:

1. A composition comprising a plasticized polyvinyl butyraldehyde acetal resin made in the presence of sulfuric acid containing on a weight basis 16–22% hydroxyl groups calculated as polyvinyl alcohol and less than 3% acetate groups calculated as polyvinyl acetate and the balance being the acetal, a solution of said resin being alkaline to brom-phenol blue as a result of having associated therewith potassium hydroxide, and 0.05–0.5 part of trimethylol melamine for every 100 parts of acetal resin which stabilizes the thermoplastic composition against discoloration and insolubility in ethanol after heating for two hours at 160° C.

2. A composition as defined in claim 1 in which such an amount of potassium hydroxide has been associated with the polyvinyl butyral resin that a solution of 100 grams thereof requires less than 25 cc. of 0.01N HCl for neutralization, using brom-phenol blue indicator.

ROBERT N. CROZIER.
EDWARD LAVIN.
ALFRED T. MARINARO.

REFERENCES CITED

The following references are of record in the file of this patent:

UNITED STATES PATENTS

| Number | Name | Date |
| --- | --- | --- |
| 2,194,613 | Perkins | Mar. 26, 1940 |
| 2,258,410 | Dahle | Oct. 7, 1941 |
| 2,282,057 | Hopkins | May 5, 1942 |
| 2,326,698 | Swain | Aug. 10, 1943 |
| 2,343,997 | Powell et al. | Mar. 14, 1944 |
| 2,374,067 | Alderson | Apr. 17, 1945 |
| 2,396,098 | Haas | Mar. 5, 1946 |
| 2,433,098 | Debacher | Dec. 23, 1947 |
| 2,453,308 | Dunlop | Nov. 9, 1948 |